United States Patent
Ohtsu

(10) Patent No.: US 8,284,521 B2
(45) Date of Patent: Oct. 9, 2012

(54) MAGNETIC HEAD SLIDER

(75) Inventor: Takayoshi Ohtsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1064 days.

(21) Appl. No.: 11/998,727

(22) Filed: Nov. 30, 2007

(65) Prior Publication Data

US 2008/0212234 A1 Sep. 4, 2008

(30) Foreign Application Priority Data

Dec. 13, 2006 (JP) .................................. 2006-336184

(51) Int. Cl.
*G11B 5/60* (2006.01)
*G11B 5/127* (2006.01)

(52) U.S. Cl. ............ 360/234.4; 360/125.31; 360/125.74
(58) Field of Classification Search ............... 360/125.3, 360/125.74, 234.4, 234.5, 125.31
See application file for complete search history.

(56) References Cited

U.S. PATENT DOCUMENTS

| | | | |
|---|---|---|---|
| 6,920,020 B2 | 7/2005 | Yamanaka et al. | |
| 6,963,464 B2 | 11/2005 | Xu et al. | |
| 7,092,193 B1 * | 8/2006 | McKenzie et al. | 360/75 |
| 7,095,587 B2 | 8/2006 | Kurita et al. | |
| 7,589,936 B1 * | 9/2009 | McFadyen et al. | 360/123.1 |
| 7,593,187 B2 * | 9/2009 | Aoki | 360/125.74 |
| 7,656,619 B1 * | 2/2010 | Yan et al. | 360/294.7 |
| 7,660,080 B1 * | 2/2010 | Liu et al. | 360/294.7 |
| 7,724,471 B2 * | 5/2010 | Sakamoto et al. | 360/128 |
| 7,729,087 B1 * | 6/2010 | Stoev et al. | 360/125.74 |
| 7,911,738 B2 * | 3/2011 | Kurita et al. | 360/125.74 |
| 7,945,963 B2 * | 5/2011 | Maeda et al. | 850/13 |
| 2003/0174430 A1 * | 9/2003 | Takahashi et al. | 360/75 |
| 2004/0240109 A1 * | 12/2004 | Hamann et al. | 360/126 |
| 2005/0094316 A1 | 5/2005 | Shiramatsu et al. | |
| 2006/0023367 A1 * | 2/2006 | Suk | 360/323 |
| 2006/0034013 A1 * | 2/2006 | Kato et al. | 360/128 |

FOREIGN PATENT DOCUMENTS

| | | |
|---|---|---|
| JP | 2005/056447 A2 | 3/2005 |
| JP | 2005/135501 A2 | 5/2005 |
| JP | 2006-004474 A | 1/2006 |
| JP | 2008/146798 A2 | 6/2008 |

* cited by examiner

*Primary Examiner* — Brian Miller
(74) *Attorney, Agent, or Firm* — Zilka-Kotab, PC

(57) ABSTRACT

Embodiments of the present invention help to provide a flying height adjusting type magnetic head slider with reduced influence of a heater coil induction field. According to one embodiment, a magnetic head slider comprises a heater, a read element, and a write element, which are formed on a substrate. The heater is formed between a lower magnetic shield of the read element and the substrate by meandering a heater coil in direction Y going away from ABS. Magnetic fields by generated in direction Y orthogonal to a track width direction X of the lower magnetic field upon energization of the heater coil are offset each other, exerting no influence on the magnetized state in the track width direction X of the lower magnetic shield. A magnetic field hx induced in the track width direction X of the lower magnetic shield is coincident with the magnetizing direction of the lower magnetic shield, acting to maintain the magnetized state of the lower magnetic shield.

20 Claims, 7 Drawing Sheets

Rotational angle of the free layer vs.
observation of shield saturation

MAGNETIC HEAD SLIDER

CROSS-REFERENCE TO RELATED APPLICATION

The instant nonprovisional patent application claims priority to Japanese Patent Application No. 2006-336184 filed Dec. 13, 2006 and which is incorporated by reference in its entirety herein for all purposes.

BACKGROUND OF THE INVENTION

A magnetic disk drive has a rotatable magnetic disk, a magnetic head slider supported by a suspension and carrying read/write elements thereon, and a positioning mechanism for moving and positioning the magnetic head slider in a radial direction of the magnetic disk through the suspension, the magnetic head slider being adapted to travel over the magnetic disk relatively to read and write information with respect to the magnetic disk. The magnetic head slider flies stably over the magnetic disk through an air bearing. In order to attain a high recording density of the magnetic disk drive and a consequent larger capacity of the magnetic disk drive, it is necessary to shorten the distance between the magnetic head slider and the magnetic disk, that is, shorten the flying height of the slider, thereby increasing a linear recording density.

In designing a flying height of a slider heretofore, allowance is made for a decrease of the flying height caused by, for example, variations in machining, a temperature difference between working environments or a difference between a flying height in write mode and that in read mode, and a flying height margin is provided to avoid slider-disk contact even in the worst condition. However, with use of a slider having a function of adjusting the flying height head by head or in accordance with a working environment, it is possible to get rid of the above flying height margin and greatly reduce the slider flying height while avoiding slider-disk contact. Recently, the slider flying height has been reduced to about 10 nm or less.

Japanese Patent Publication No. 2005-135501 ("Patent Literature 1") has proposed a slider structure wherein a heater formed by a thin film resistor is disposed near both read and write elements and a part of a slider is heated as necessary and is thereby thermally expanded and projected to adjust the distance between the read/write elements and a magnetic disk. Japanese Patent Publication No. 2005-056447 ("Patent Literature 2") has proposed a slider structure wherein a heater is disposed away from the tips of read/write elements and both heater and read/write elements are enclosed with a resin film of low rigidity, thereby increasing the amount of projection of the read/write elements per unit electric power without raising the temperature of the read element which weaken against a thermal load.

As noted above, by using the flying height adjusting type magnetic head slider which utilizes thermal expansion and projection with a heater, it becomes possible to correct variations in machining, variations in flying height caused by a temperature difference between working environments and a difference between a flying height in write mode and that in read mode. However, it had been found that if a heater is disposed near such a read element as a GMR head or a TMR head, an induction field generated by an electric current flowing in a heater coil exerts an influence on the magnetization of a magnetic shield of the GMR head or the TMR head.

FIG. 7 shows a sectional structure of the magnetic head slider described in Patent Literature 1 and the layout of a lower magnetic shield and a heater coil. In the illustrated structure, a magnetic head slider 1000 has a heater 400, a read element 200 and a write element 300 which are stacked on an element forming surface of a slider substrate 110. The read element 200 has a lower magnetic shield 210, a GMR film or a TMR film 220 and an upper magnetic shield 230. The heater 400 is formed by causing a thin film resistance wire (heater coil) 410 to meander in a track width direction X below the lower magnetic shield 210. In FIG. 7, in order to make the meandering direction of the heater coil 410 easier to see, the heater coil 410 is shown schematically on the lower magnetic shield 210. When an electric current i is supplied to the heater coil 410, induction fields are generated in both hx and hy directions. Magnetic fields generated in the track width direction X of the lower magnetic shield 210 are offset each other, but a magnetic field hy generated in a direction (ABS direction) orthogonal to the track width direction extends into the lower magnetic shield 210.

The upper and lower magnetic shields 230, 210 are magnetized uniformly in the track width direction X lest a magnetic noise should be superimposed on a read output of the GMR film or the TMR film 220 disposed between both magnetic shields. However, as noted above, if the induction field by in the ABS direction Y generated by the electric current i flowing in the heater coil 410 extends into the lower magnetic field 210, the magnetizing direction of the lower magnetic field rotates partially and an area is created wherein the magnetization is not uniform. Once such an area of non-uniform magnetization is created in the lower magnetic shield 210, the motion of the magnetic field against an external magnetic field becomes non-uniform and disturbance occurs there. This appears as noise in the read output of the GMR film or the TMR film 220. In particular, in the TMR head, this influence is greater than in the GMR head because it uses both the magnetic shield and the electrode in combination.

BRIEF SUMMARY OF THE INVENTION

Embodiments in accordance with the present invention provide a flying height adjusting type magnetic head slider with reduced influence of a heater coil induction field. According to the particular embodiment shown in FIG. 1, a magnetic head slider 1 comprises a heater 4, a read element 2, and a write element 3, which are formed on a substrate 1a. The heater 4 is formed between a lower magnetic shield 21 of the read element 2 and the substrate 1a by meandering a heater coil 41 in direction Y going away from ABS. Magnetic fields hy generated in direction Y orthogonal to a track width direction X of the lower magnetic field 21 upon energization of the heater coil 41 are offset each other, exerting no influence on the magnetized state in the track width direction X of the lower magnetic shield 21. A magnetic field hx induced in the track width direction X of the lower magnetic shield 21 is coincident with the magnetizing direction of the lower magnetic shield, acting to maintain the magnetized state of the lower magnetic shield.

DETAILED DESCRIPTION OF THE INVENTION

It has been found that when a heater for adjusting the flying height is disposed near a magnetoresistive head, an induction field induced upon energization of a heater coil exerts an influence on the magnetization of a magnetic shield.

Embodiments of the present invention relate to a magnetic head slider for attaining a high recording density of a magnetic disk drive. In particular, embodiments of the present invention are concerned with a magnetic head slider having a function of adjusting the distance between a magnetic disk and read/write elements.

It is an object of embodiments of the present invention to provide a flying height adjusting type magnetic head slider with reduced influence of a heater coil induction field.

According to embodiments of the present invention, in order to achieve the above-mentioned object, there is provided a magnetic head slider comprising: a heater formed on an element forming surface of the slider; a read element; a write element; and insulating layers for isolating them. The read element has a lower magnetic shield, an upper magnetic shield, and a magnetoresistive film disposed between the lower magnetic field and the upper magnetic field. The heater is a heat coil that generates an induction field upon energization, the induction field acting in a magnetizing direction of the lower magnetic shield.

The heater coil is disposed between the lower magnetic shield and the slider and is wired meanderingly in a direction orthogonal to a track width direction of the lower magnetic shield.

Also, there also is provided a magnetic head slider comprising: a heater formed on an element forming surface of the slider; a read element; a write element; and insulating layers for isolating them. The read element has a lower magnetic shield, an upper magnetic shield, and a magnetoresistive film disposed between the lower magnetic field and the upper magnetic field. The heater is a heater coil disposed behind the lower magnetic shield, the heater coil being wired meanderingly in a direction orthogonal to a track width direction of the lower magnetic shield.

There further is provided a magnetic head slider comprising: a heater formed on an element forming surface of the slider; a read element; a write element; and insulating layers for isolating them. The read element has a lower magnetic shield, an upper magnetic shield, and a magnetoresistive film disposed between the lower magnetic field and the upper magnetic field. The heater is a heater coil disposed behind and on both sides of the lower magnetic shield, the heater coil being wired meanderingly in a track width direction of the lower magnetic shield.

According to embodiments of the present invention it is possible to provide a flying height adjusting type magnetic head slider with reduced influence of a heater coil induction field.

Figure 2:
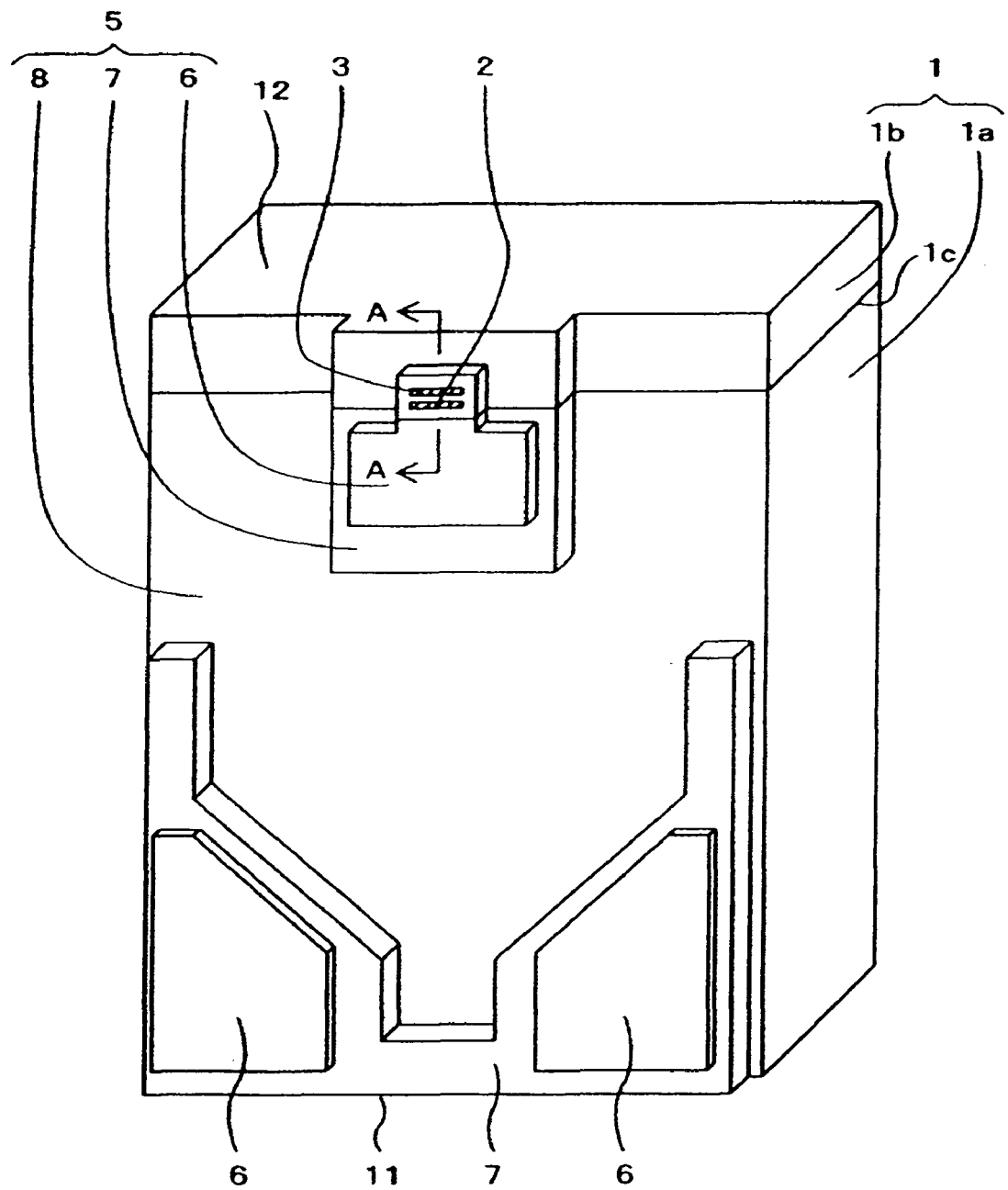
FIG. 2 is a perspective view of a magnetic head slider to which an embodiment of the present invention is applied, as seen from an air bearing surface side.

Embodiments of the present invention will now be described with reference to the drawings. FIG. 2 shows an entire configuration of a flying height adjusting type magnetic head slider to which an embodiment of the present invention is applied, as seen from an air bearing surface side. A flying height adjusting type magnetic head slider (hereinafter referred to simply as "magnetic head slider") 1 is made up of a substrate (slider) 1a of alumina-titanium carbide sintered compact (Altic) and a thin film head portion 1b formed on an element forming surface 1c of the slider 1a. A wafer is subjected to such processes as sputtering, plating and polishing repeatedly to form the thin film head portion 1b on the element forming surface 1c of the slider 1a. Thereafter, the wafer is cut into on-bar blocks by dicing and, after subjecting the blocks to a predetermined machining work, a large number of magnetic head sliders 1 are cut out from the blocks. The magnetic head sliders 1 are each substantially in the shape of a rectangular parallelepiped having, for example, a length of 1.25 mm, a width of 1.0 mm and a thickness of 0.3 mm. It has a total of six faces which are an air bearing surface 5, a leading end face 11, a trailing end face 12, both side faces and a back face. The air bearing surface is finished to be smooth by polishing. The size of the slider is not limited to the above size. It may be reduced in size, e.g., 0.85 mm long, 0.7 mm wide and 0.23 mm thick.

The air bearing surface 5 is provided with fine stepped portions (step bearing) by such a process as ion milling or etching. It generates air pressure in opposition to a disk (not shown) and functions as an air bearing which bears a load imposed on the back face. In the figure the stepped portions are drawn emphatically.

The air bearing surface is substantially classified into three types of parallel stepped surfaces, which are a rail surface 6 closest to the disk, a shallow groove surface 7 as a stepped bearing surface deeper about 100 to 200 nm than the rail surface 6, and a deep groove surface 8 deeper by about 1 μm than the rail surface 6. When an air flow created by rotation of the disk advances to the rail surface 6 from the shallow groove surface 7 as the leading end face 11—side stepped bearing, it is compressed by a tapered channel and produces a positive air pressure. On the other hand, when an air flow advances to the deep groove surface 8 from the rail surface 6 and the shallow groove surface 7, a negative air pressure occurs due to channel expansion.

The magnetic head slider 1 flies over in an attitude such that the flying height on the leading end face 11 side becomes larger than that on the trailing end face 12 side. Therefore, the rail surface (flying pad) 6 closed to the trailing edge comes closest to the disk. In the vicinity of the trailing edge, the rail surface 6 projects with respect to the surrounding shallow groove surface 7 and deep groove surface 8, so that the rail surface 6 comes closest to the disk unless the slider pitch attitude and roll attitude tilt beyond a certain limit. A read element 2 and a write element 3 are formed in a portion of the rail surface which portion belongs to the thin film head portion 1b. A load pressed from a load beam (not shown) and a positive or negative air pressure induced on the air bearing surface 5 are well balanced to maintain the distance from the read element 2 and the write element 3 to the disk at an appropriate value of about 10 nm or smaller.

Although a description has been given about the magnetic head slider of a two-step bearing type wherein the air bearing surface 5 is formed substantially by three types of parallel surfaces 6, 7, 8, embodiments of the present invention are also applicable to a magnetic head slider of a three- or more-step bearing type wherein the air bearing surface is formed by four or more types of parallel surfaces.

Figure 1:
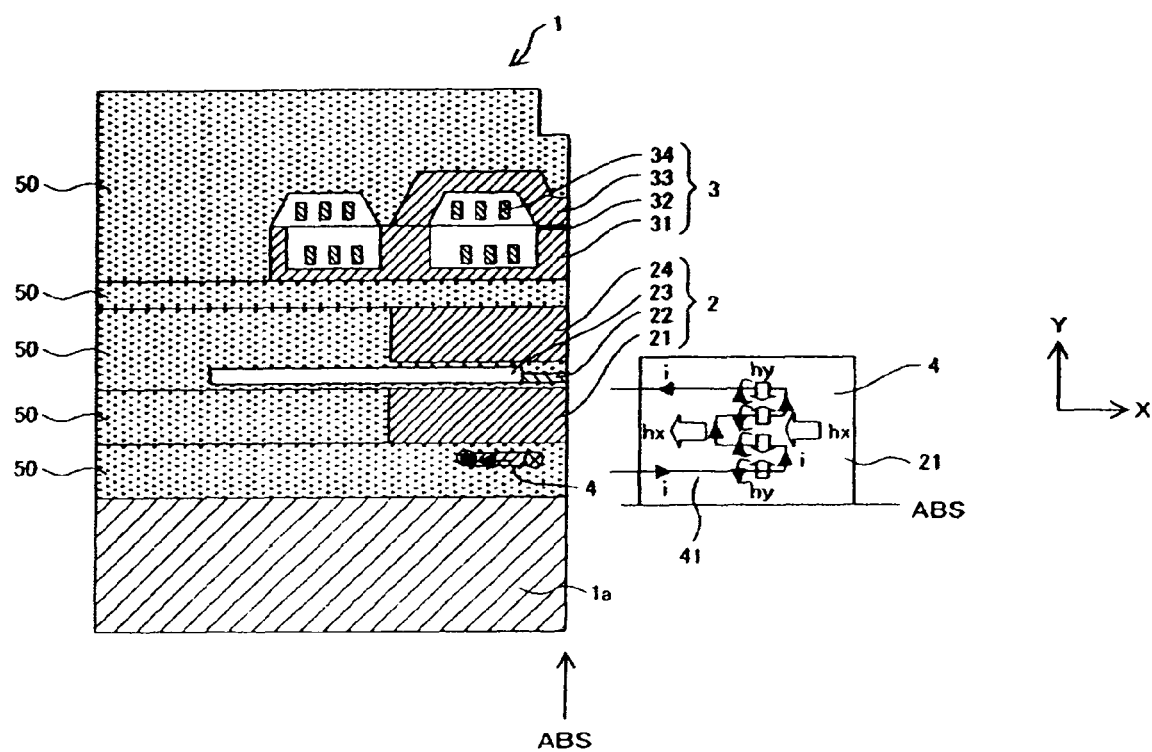
FIG. 1 is a sectional view of the vicinity of a trailing edge of a magnetic head slider according to a first embodiment of the present invention.

FIG. 1 is a sectional view taken on line A-A in FIG. 2, showing the vicinity of a trailing end face 12 of a magnetic head slider 1 according to a first embodiment of the present invention. A thin film head portion 1b formed on an element forming surface 1c of an Altic substrate 1a of the magnetic head slider 1 includes a heater 4, a read element 2, a write element 3, insulating layers 50 such as alumina layers for isolating them, and electric wiring films (not shown) for those elements. The read element 2 is made up of a lower magnetic shield 21, a magnetoresistive film 22, an electrode 23 and an upper magnetic shield 24. An insulating layer (gap layer) is disposed between the lower magnetic shield 21 and the magnetoresistive film 22 and a like layer is disposed between the magnetoresistive film 22 and the upper magnetic shield 23. The magnetoresistive film 22 is a GMR (Giant Magnetoresistive) film or a TMR (Tunneling Magnetoresistive) film. The write element 3 is made up of a lower magnetic pole piece 31, an upper magnetic pole piece 33 which forms a magnetic gap 32 on an air bearing surface side and which is connected in a rear portion thereof to the lower magnetic pile piece 31 magnetically, and a coil 34 formed between the lower and upper magnetic pole pieces 31, 33 through an interlayer insulating layer.

Figure 7:
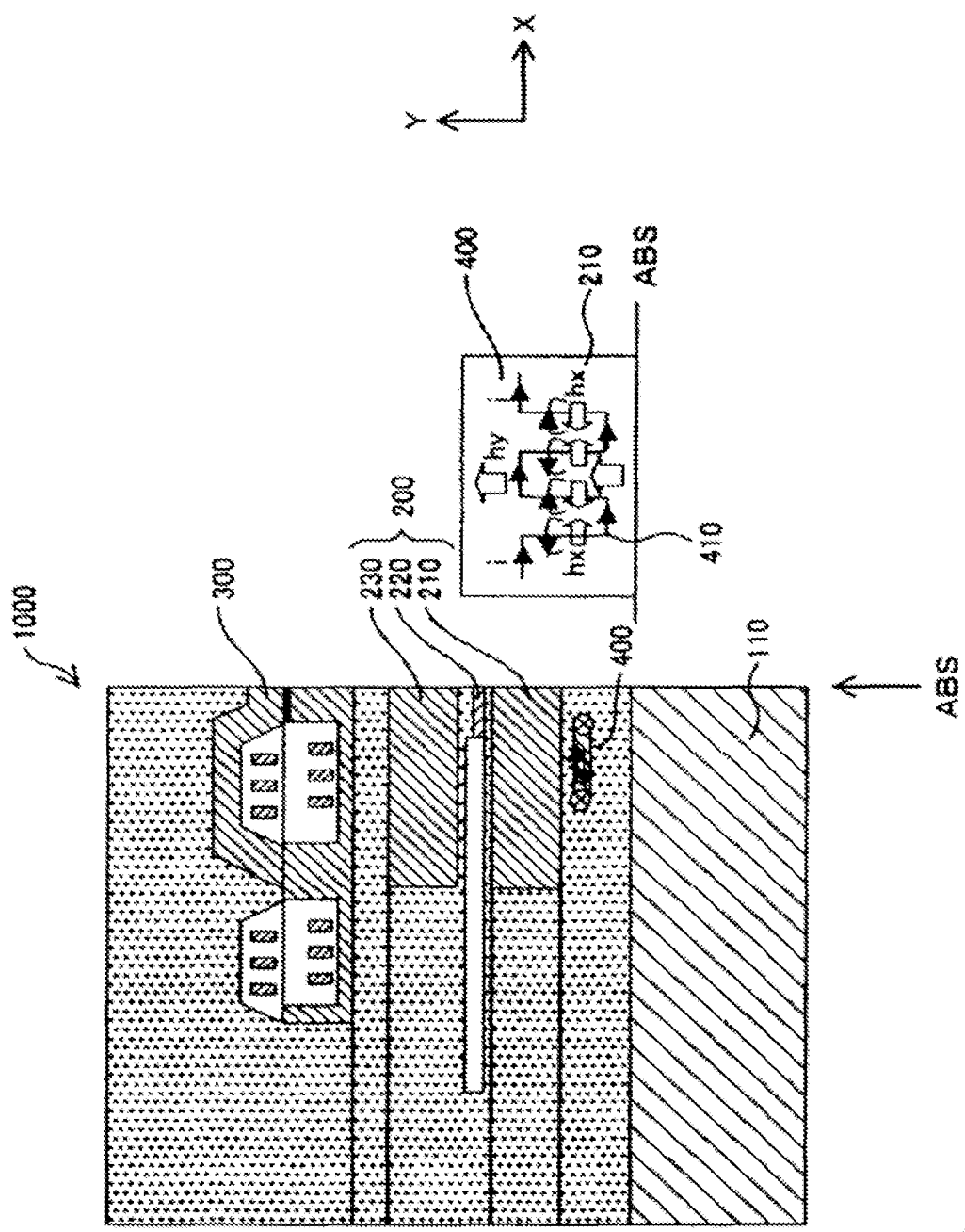
FIG. 7 is a sectional view of the vicinity of a trailing edge of a conventional magnetic head slider.

The heater 4 is disposed between the lower magnetic shield 21 of the read element 2 and the substrate 1a at a position retreated from ABS so as not to approach the magnetoresistive film 22. The heater 4 is formed by meandering a thin film resistor (heater coil) 41 such as NiCr, Ta or W in a direction Y away from ABS. For example, it is formed by meandering a thin line of 0.5 μm thick by 4.5 μm wide in an area of 60 μm deep by 60 μm wide and filling up the gap with alumina. The resistance value is about 50 ohms. This heater layout corresponds to a 90° turned layout of the heater 400 in the conventional magnetic head slider 1000 shown in FIG. 7.

FIG. 1 schematically shows the relation between the lower magnetic shield 21 and the heater coil 41 in order to make the meandering direction of the heater coil easier to see. When an electric current i is supplied to the heater coil 41, induction fields are generated in both hx and hy directions. Magnetic fields hy induced in a direction (ABS direction) Y orthogonal to a track width direction X of the lower magnetic shield 21 are offset each other, exerting no influence on the state of being magnetized in the track width direction of the lower magnetic shield 21. A magnetic field hx generated in the track width direction X of the lower magnetic shield 21 is coincident with the magnetizing direction of the lower magnetic shield 21 and acts to maintain the magnetized state of the lower magnetic shield.

Figure 3:
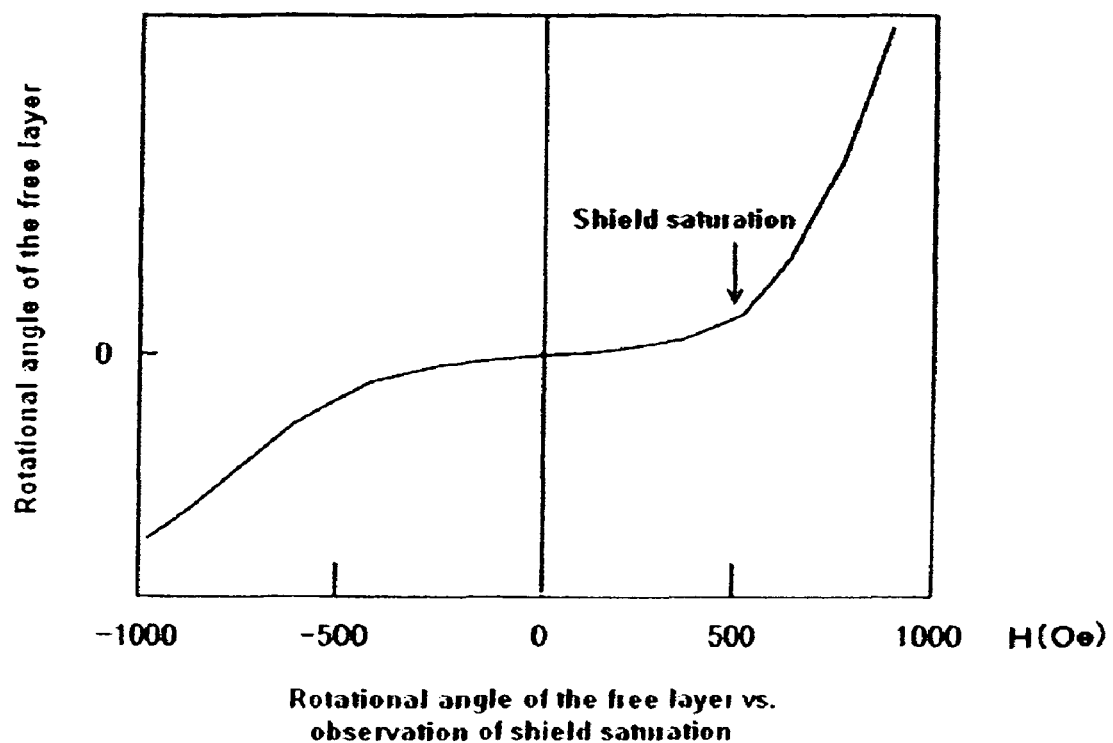
FIG. 3 shows a rotational angle of a free layer of a magnetoresistive film vs. the results of observation of shield saturation.

FIG. 3 shows the relation between an external magnetic field applied to the magnetic shields and a rotational angle of a free layer of the magnetoresistive film. In the same figure, the strength of the external magnetic field is plotted along the axis of abscissa, while the rotational angle of the free layer is plotted along the axis of ordinate. The magnetic field has anisotropy in the track width direction in the manufacturing stage. As shown in FIG. 3, under the action of an external magnetic field of about 200 Oe (16 kA/m) or more, the magnetized state begins to be influenced, and at an external magnetic field of about 500 Oe (40 kA/m), the magnetoresistive film begins to be influenced under the influence of magnetization of the shields. If a portion not uniform in magnetization is present within the magnetic shields, noise occurs in the read output of the magnetoresistive film disposed between the magnetic shields as noted above. In order to avoid influence on magnetization of the magnetic shields it is preferable that the strength of an external magnetic field applied partially be set at about 50 Oe (4 kA/m) or less.

According to the above first embodiment, the magnetic fields hy generated in the direction (ABS direction) Y orthogonal to the track width direction X of the lower magnetic shield 21 are offset each other and the magnetic field hy generated in the track width direction X of the lower magnetic shield 21 acts so as to maintain the magnetized state of the lower magnetic shield, so that the magnetized state of the lower magnetic shield 21 is maintained in its initial state, whereby it is possible to prevent the occurrence of noise in the read output of the magnetoresistive film.

Figure 4:
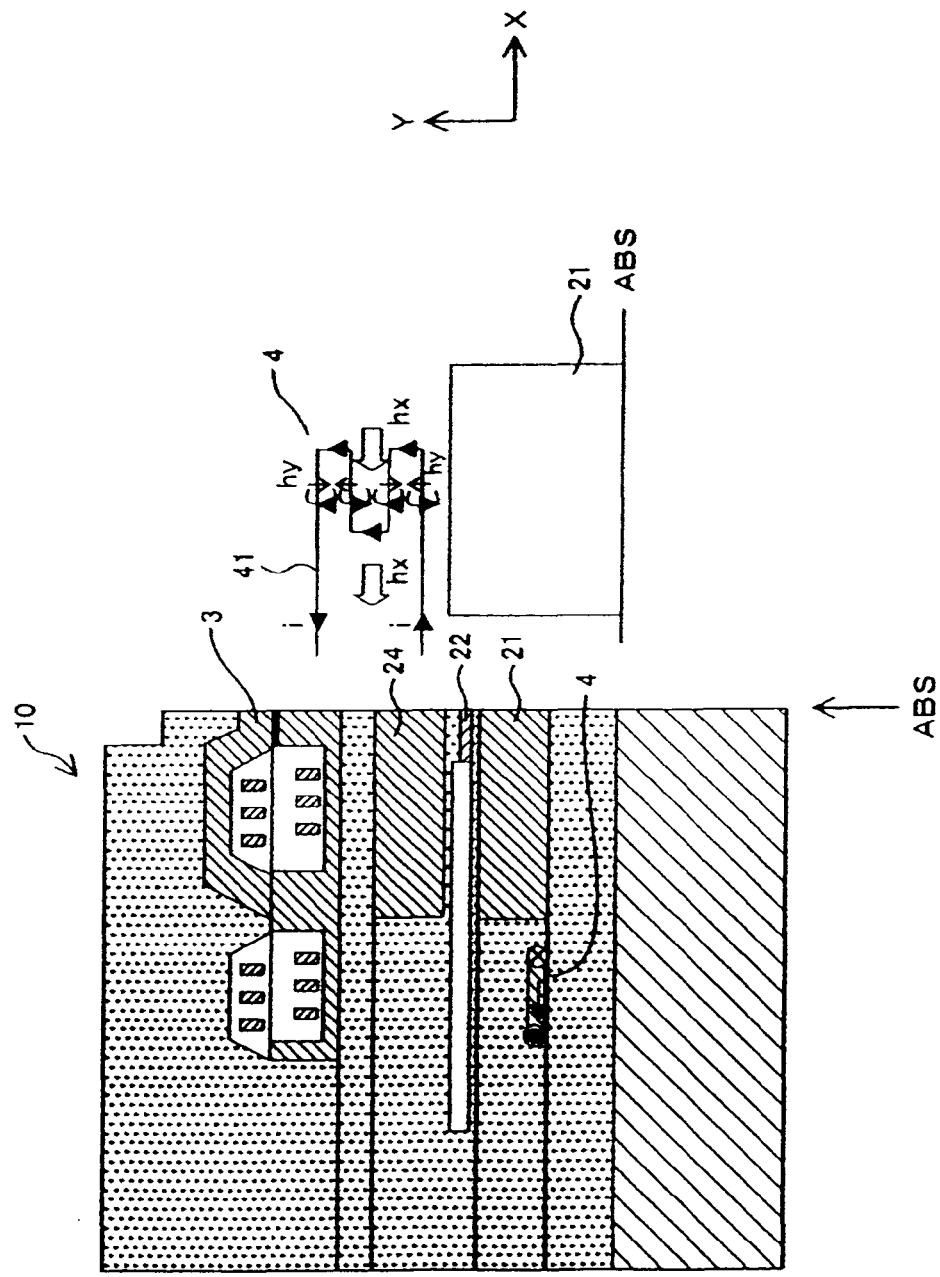
FIG. 4 is a sectional view of the vicinity of a trailing edge of a magnetic head slider according to a second embodiment of the present invention.

Next, a magnetic head slider 10 according to a second embodiment of the present invention will be described with reference to FIG. 4. FIG. 4 schematically shows a section near a trailing end face of the magnetic head slider 10 and the relation between a lower magnetic field 21 and a heater coil 41. An entire configuration of the magnetic head slider 10 is the same as that shown in FIG. 2 and an element configuration thereof is the same as that of the magnetic head slider 1 of the first embodiment described above except the layout of a heater 4. In the magnetic head slider 10, a heater 4 is disposed behind the lower magnetic shield 21 so as not to overlap the lower magnetic shield in the stacking direction. A meandering direction of the heater coil 41 is the same as in the first embodiment, i.e., ABS direction Y. When an electric current i is supplied to the heater coil 41, induction fields are generated in both X and Y directions as in the first embodiment, but magnetic fields hy generated in the ABS direction Y of the lower magnetic shield 21 are offset each other and do not enter the lower magnetic shield. A magnetic field hx generated in the track width direction X of the lower magnetic shield 21 is coincident with the magnetizing direction of the lower magnetic shield, but does not enter the lower magnetic shield, either.

According to the above second embodiment, since the heater 4 is disposed behind the lower magnetic shield 21 and the meandering direction of the heater coil 41 is the ABS direction Y, the induction fields hy and hx induced by energization of the heater coil 41 do not exert any influence on the magnetized state of the lower magnetic shield 21. Therefore, a noise does not occur in the read output of the magnetoresistive film under the induction fields induced by energization of the heater coil 41. Since the heater 4 is disposed behind the lower magnetic shield 21, the noise preventing effect is more outstanding than in the first embodiment, but the amount of projection of the read/write elements per unit electric power is the smaller.

Figure 5:
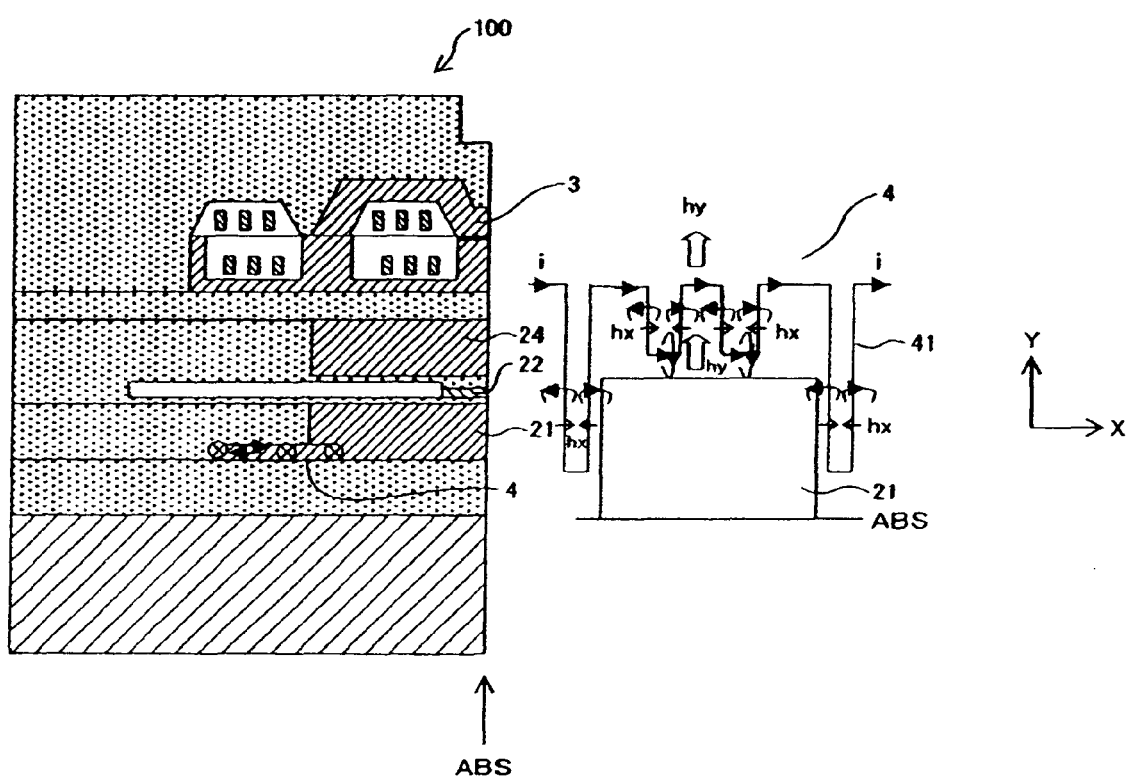
FIG. 5 is a sectional view of the vicinity of a trailing edge of a magnetic head slider according to a third embodiment of the present invention.

A magnetic head slider 100 according to a third embodiment of the present invention will now be described with reference to FIG. 5. FIG. 5 schematically shows a sectional structure near trailing end face of the magnetic head slider 100 and the relation between a lower magnetic shield 21 and a heater coil 41. An entire configuration of the magnetic head slider 100 is the same as that shown in FIG. 2 and an element configuration thereof is the same as that of the magnetic head slider 1 of the above first embodiment except the layout and shape of the heater 4. In the magnetic head slider 100, a heater coil 41 is disposed behind and on both sides of the lower magnetic shield 21 so as not to overlap the lower magnetic shield in the stacking direction. A meandering direction of the heater coil 41 is the track width direction X. When an electric current i is supplied to the heater coil 41, induction fields hx and hy occur in both X and Y directions, but magnetic fields hx generated in the track width direction X of the lower magnetic shield 21 are offset each other and do not enter the lower magnetic shield 21. A magnetic field hy generated in the ABS direction Y of the lower magnetic shield 21 is coincident with a direction orthogonal to the magnetizing direction of the lower magnetic shield, but does not enter the lower magnetic shield, either, because there is no overlapping portion of the heater coil 41 with the lower magnetic shield.

Figure 6:
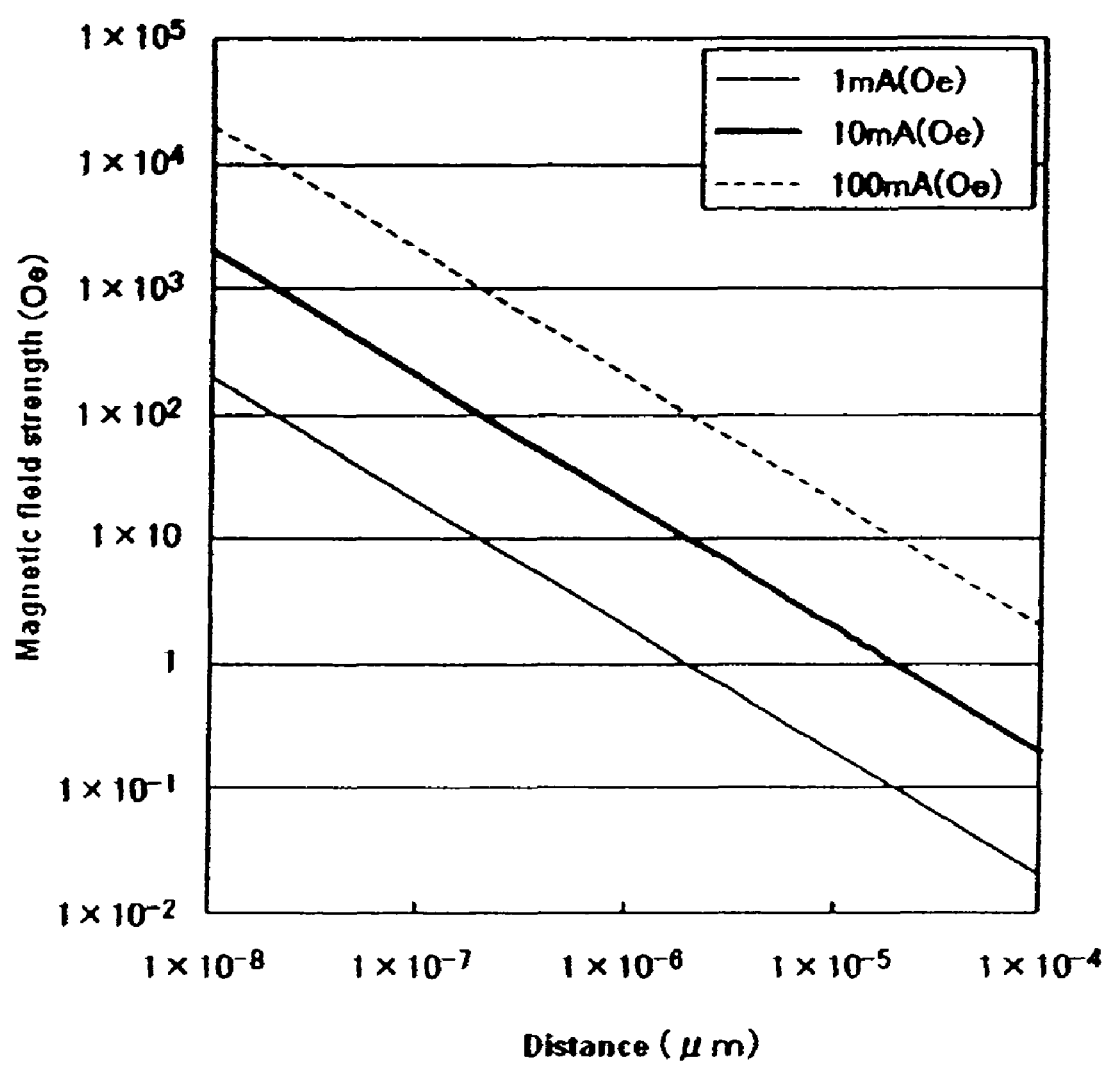
FIG. 6 is a diagram showing the relation between the distance from a heater coil and the magnetic field strength.

FIG. 6 shows the relation between the distance from the heater coil 41 disposed behind the lower magnetic shield 21 and the strength of the induction field hy generated upon energization of the heater coil 41. When an electric current of 10 mA is supplied to the heater coil 41, a magnetic field generated at a position spaced about 0.1 µm ($1\times10^{-7}$ µm) from the heater coil 41 is about 200 Oe (16 kA/m). It is seen that this magnetic field can be made 50 Oe (4 KA/m) or less by setting the distance at about 0.4 µm ($4\times10^{-7}$ µm) or more. Thus, in the above third embodiment, from the relation with the amount of the electric current supplied, the distance between the lower magnetic shield 21 and the heater coil 41 disposed behind the lower magnetic shield may be set at a distance at which the induction field hy becomes 50 Oe (4 kA/m) or less.

According to the above third embodiment, since the induction fields hy and hx inducted upon energization of the heater coil 41 do not exert any influence on the magnetized state of the lower magnetic shield 21, a noise does not occur in the read output of the magnetoresistive film under the induction fields. Moreover, since the heater coil 41 is disposed behind and on both sides of the lower magnetic shield 21, the amount of projection of the read/write elements per unit electric power does not become smaller.

What is claimed is:

1. A magnetic head slider comprising:
   a heater formed on an element forming surface of the slider;
   a read element;
   a write element; and
   insulating layers for isolating the heater, the read element and the write element;
   wherein the read element has a lower magnetic shield, an upper magnetic shield, and a magnetoresistive film disposed between the lower magnetic shield and the upper magnetic shield,
   wherein the heater is a heater coil that generates an induction field upon energization, the induction field acting in a track width direction coincident with a magnetizing direction of the lower magnetic shield, and
   wherein a strength of the induction field acting in a direction orthogonal to the track width direction is insufficient to influence the magnetizing direction of the lower magnetic shield.

2. The magnetic head slider according to claim 1 wherein the heater coil is disposed between the lower magnetic shield of the read element and the slider, and is wired meanderingly in a direction orthogonal to a track width direction of the lower magnetic shield.

3. The magnetic head slider according to claim 1 wherein the heater coil is disposed between the lower magnetic shield of the read element and the slider, and is wired meanderingly in a depth direction of the lower magnetic shield.

4. The magnetic head slider according to claim 1 wherein the heater coil is a thin film resistor and is disposed so as not to overlap the lower magnetic shield.

5. The magnetic head slider according to claim 1 wherein the magnetoresistive film is a GMR film or a TMR film.

6. The magnetic head slider according to claim 1 wherein the strength of the induction field acting in the direction orthogonal to the track width direction is insufficient to influence the magnetizing direction of the lower magnetic shield because portions of the induced magnetic field that act in the direction orthogonal to the track width direction are offset from each other, thereby exerting no influence on the induced magnetic field.

7. The magnetic head slider according to claim 1 wherein a flying height of the magnetic head slider is adjustable using the heater, wherein the energization is sufficient for the heater to cause thermal protrusion of the lower magnetic shield towards a magnetic medium.

8. The magnetic head slider according to claim 1 wherein the induction field acts to maintain a magnetized state of the lower magnetic shield and does not act to cause any rotation of the magnetized state of the lower magnetic shield.

9. The magnetic head slider according to claim 1 wherein noise is not introduced into a read output of the magnetic head slider due to the induction field.

10. The magnetic head slider according to claim 1 wherein the heater formed on the element forming surface of the slider is positioned such that strength of the induction field acting in the direction orthogonal to the track width direction is about 50 Oe or less.

11. A magnetic head slider comprising:
    a heater formed on an element forming surface of the slider;
    a read element;
    a write element; and
    insulating layers for isolating the heater, the read element, and the write element;
    wherein the read element has a lower magnetic shield, an upper magnetic shield, and a magnetoresistive film disposed between the lower magnetic shield and the upper magnetic shield,
    wherein the heater is a heater coil that generates an induction field upon energization, the induction field acting in a track width direction coincident with a magnetizing direction of the lower magnetic shield,
    wherein the heater coil is disposed behind the lower magnetic shield, the heater coil being wired meanderingly in a direction orthogonal to a track width direction of the lower magnetic shield,
    wherein a strength of the induction field acting in the direction orthogonal to the track width direction is insufficient to influence the magnetizing direction of the lower magnetic shield.

12. The magnetic head slider according to claim 11 wherein the heater coil is disposed so as not to overlap the lower magnetic shield.

13. The magnetic head slider according to claim 11 wherein the heater coil is a thin film resistor.

14. The magnetic head slider according to claim 11 wherein the magnetoresistive film is a GMR film or a TMR film.

15. A magnetic head slider comprising:
    a heater formed on an element forming surface of the slider;
    a read element;
    a write element; and
    insulating layers for isolating the heater, the read element, and the write element,
    wherein the read element has a lower magnetic shield, an upper magnetic shield, and a magnetoresistive film disposed between the lower magnetic shield and the upper magnetic shield,
    wherein the heater is a heater coil that generates an induction field upon energization, the induction field acting in a track width direction coincident with a magnetizing direction of the lower magnetic shield, wherein the heater coil is disposed behind and on both sides of the lower magnetic shield, the heater coil being wired meanderingly in a track width direction of the lower magnetic shield, wherein a strength of the induction field acting in the direction orthogonal to the track width direction is insufficient to influence the magnetizing direction of the lower magnetic shield.

16. The magnetic head slider according to claim 15 wherein the heater coil is disposed so as not to overlap the lower magnetic shield.

17. The magnetic head slider according to claim 15 wherein an induction field generated in the track width direction of the heater coil is offset by the meandering wiring.

18. A magnetic data storage device, comprising:
 a magnetic medium;
 at least one magnetic head slider for reading from and/or writing to the magnetic medium, the magnetic head slider comprising:
  a heater formed on an element forming surface of the slider;
  a read element;
  a write element; and
  insulating layers for isolating the heater, the read element and the write element;
  wherein the read element has a lower magnetic shield, an upper magnetic shield, and a magnetoresistive film disposed between the lower magnetic shield and the upper magnetic shield,
  wherein the heater is a heater coil that generates an induction field upon energization, the induction field acting in a track width direction coincident with a magnetizing direction of the lower magnetic shield, and
  wherein a strength of the induction field acting in a direction orthogonal to the track width direction is insufficient to influence the magnetizing direction of the lower magnetic shield;
 a drive mechanism for moving the magnetic medium across the at least one magnetic head; and
 a controller for controlling operation of the at least one magnetic head slider.

19. The magnetic head slider according to claim 1 wherein a magnetic component of the induction field acting in a track width direction coincident with a magnetizing direction of the lower magnetic shield acts to maintain a magnetized state of the lower magnetic shield.

20. The magnetic head slider according to claim 19 wherein magnetic components of the induction field acting in the direction orthogonal to the track width direction offset one another.

* * * * *